(12) United States Patent
Hata et al.

(10) Patent No.: US 11,276,510 B2
(45) Date of Patent: Mar. 15, 2022

(54) PROTECTION COMPONENT AND PROTECTION METHOD

(71) Applicant: KYOCERA CORPORATION, Kyoto (JP)

(72) Inventors: Tetsuya Hata, Yokohama (JP); Shigeki Ohara, Yamato (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 16/765,807

(22) PCT Filed: Nov. 1, 2018

(86) PCT No.: PCT/JP2018/040749
§ 371 (c)(1),
(2) Date: May 20, 2020

(87) PCT Pub. No.: WO2019/102818
PCT Pub. Date: May 31, 2019

(65) Prior Publication Data
US 2020/0388417 A1 Dec. 10, 2020

(30) Foreign Application Priority Data
Nov. 24, 2017 (JP) .............................. JP2017-226191

(51) Int. Cl.
*H01B 7/282* (2006.01)
*H01B 7/00* (2006.01)
(Continued)

(52) U.S. Cl.
CPC ........... *H01B 7/282* (2013.01); *H01B 7/0045* (2013.01); *H02G 15/013* (2013.01); *H02G 15/04* (2013.01)

(58) Field of Classification Search
CPC .... H01B 7/282; H01B 7/0045; H02G 15/013; H02G 15/04; H02G 15/06; H02G 15/003; H02G 15/10; H01R 13/5202; H01R 13/5205; H01R 13/5219; H01R 13/521; H01R 13/5216; H01R 13/5221; H05K 5/0247; H05K 5/06; H05K 5/061; H05K 5/069
See application file for complete search history.

(56) References Cited

U.S. PATENT DOCUMENTS

| 4,963,700 | A | * | 10/1990 | Olsen | ..................... H02G 15/18 174/138 F |
| 5,099,088 | A | * | 3/1992 | Usami | ..................... H01R 4/22 156/49 |

(Continued)

FOREIGN PATENT DOCUMENTS

| JP | 05217610 A | * | 8/1993 | ........... H01R 4/2433 |
| JP | H069064 U | | 2/1994 | |

(Continued)

*Primary Examiner* — Hoa C Nguyen
*Assistant Examiner* — Amol H Patel
(74) *Attorney, Agent, or Firm* — Duane Morris LLP

(57) ABSTRACT

A protection component (10) according to this disclosure configured to surround and protect a part to be protected of an object to be protected (60) has a first housing (20) and a second housing (30) capable of being fitted together and a filler (50) loaded into at least one of the housings, and the filler (50) loaded supports the object to be protected (60).

10 Claims, 12 Drawing Sheets

(51) Int. Cl.
*H02G 15/013* (2006.01)
*H02G 15/04* (2006.01)
*H01R 13/506* (2006.01)
*H01R 13/52* (2006.01)
*H02G 15/113* (2006.01)
*H02G 3/22* (2006.01)

(56) References Cited

U.S. PATENT DOCUMENTS

| | | | | |
|---|---|---|---|---|
| 5,594,210 | A | * | 1/1997 | Yabe .................. H01R 4/70 |
| | | | | 174/76 |
| 5,606,150 | A | * | 2/1997 | Radliff .................. H01R 4/646 |
| | | | | 174/92 |
| 9,875,824 | B2 | | 1/2018 | Oga et al. |
| 2010/0124454 | A1 | * | 5/2010 | Yaworski ............. H02G 15/117 |
| | | | | 403/23 |
| 2013/0165002 | A1 | | 6/2013 | Nooner |
| 2016/0189828 | A1 | | 6/2016 | Oga et al. |

FOREIGN PATENT DOCUMENTS

| | | |
|---|---|---|
| JP | H11214053 A | 8/1999 |
| JP | 2004224286 A | 8/2004 |
| JP | 2005251400 A | 9/2005 |
| JP | 2009124814 A | 6/2009 |
| JP | 2009217982 A | 9/2009 |
| JP | 2016119821 A | 6/2016 |

* cited by examiner

PROTECTION COMPONENT AND PROTECTION METHOD

CROSS-REFERENCE TO RELATED APPLICATION

The present application claims priority to and the benefit of Japanese Patent Application No. 2017-226191 filed on Nov. 24, 2017, the entire contents of which are incorporated herein by reference.

TECHNICAL FIELD

This disclosure relates to a protection component and a protection method.

BACKGROUND

Components have been known which apply protection processing such as waterproof, dustproof, insulating or rustproof processing to a part to be protected of an object to be protected such as wire end or a part of wire where protective coating has been removed.

For example, Patent Literature (PTL) 1 discloses a water stop structure that includes a conductive tubular shield member covering a plurality of conduction paths together and a first water stop means, a second water stop means and a third water stop means disposed in order from the inside at a water stop target location, and is capable of stopping water at a predetermined position.

CITATION LIST

Patent Literature

PLT 1: JP2016-119821A

SUMMARY

A protection component according to an embodiment of this disclosure is a protection component configured to surround and protect a part to be protected of an object to be protected, including a first housing and a second housing capable of being fitted together; and
a filler loaded into at least one of the housings, wherein
the filler loaded supports the object to be protected.

A protection method according to an embodiment of this disclosure is a protection method of surrounding and protecting a part to be protected of an object to be protected, the method including the steps of:

loading a filler into at least one of a first housing and a second housing capable of being fitted together;

supporting the object to be protected by the filler loaded; and fitting the first housing and the second housing together.

DETAILED DESCRIPTION

Figure 1:
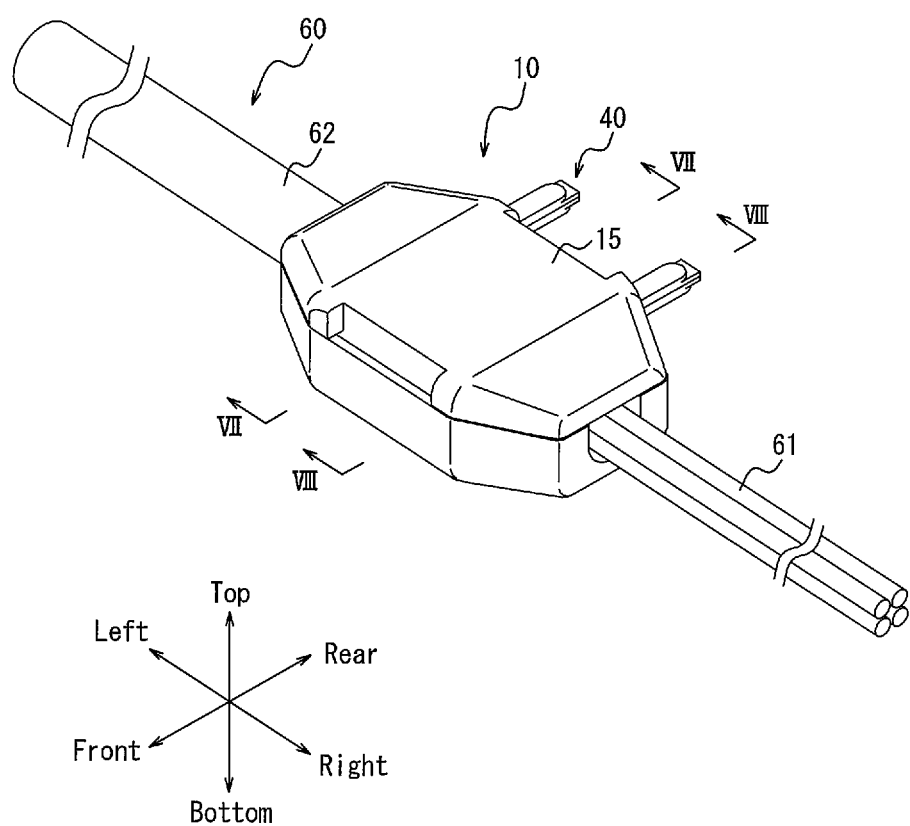
FIG. 1 is an external perspective view of a protection component according to an embodiment attached to an object to be protected.

In the water stop structure disclosed in PTL 1, it is necessary to attach a plurality of components to a conduction path, and an attachment work in a narrow space is difficult. A long-term reliability of such a water stop structure depends on the accuracy of the attachment work. Therefore, when accuracy of the attachment work varies in a place where the attachment work is difficult to do, a long-term reliability also varies.

According to a protection component and a protection method of an embodiment of this disclosure, attachment workability and a long-term reliability with respect to protection are improved.

An embodiment of this disclosure will be described in more detail below with reference to the accompanying drawings. In the following description, a front-rear direction, a right-left direction and a top-bottom direction are based on the directions of the arrows in the figures. The directions of each arrow are consistent in the drawings through FIGS. 1 to 10.

Figure 2:
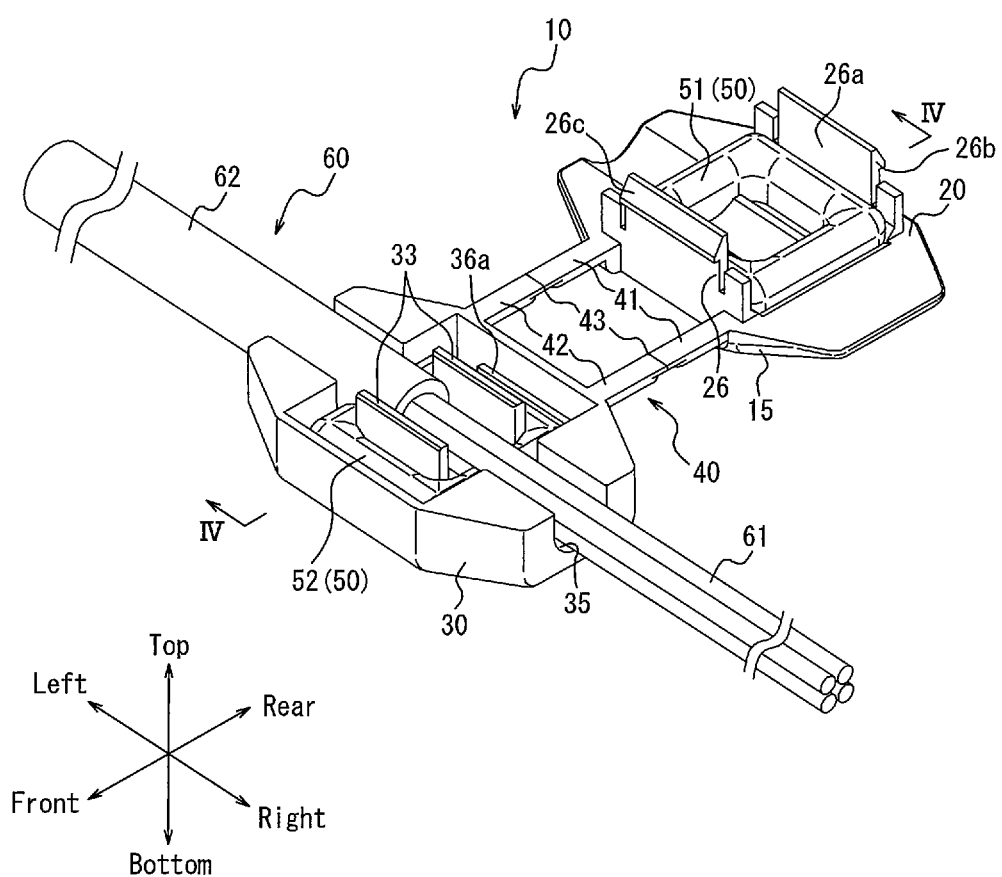
FIG. 2 is a perspective view of the protection component in FIG. 1 that temporarily holds the object to be protected in an extended state.
Figure 3:
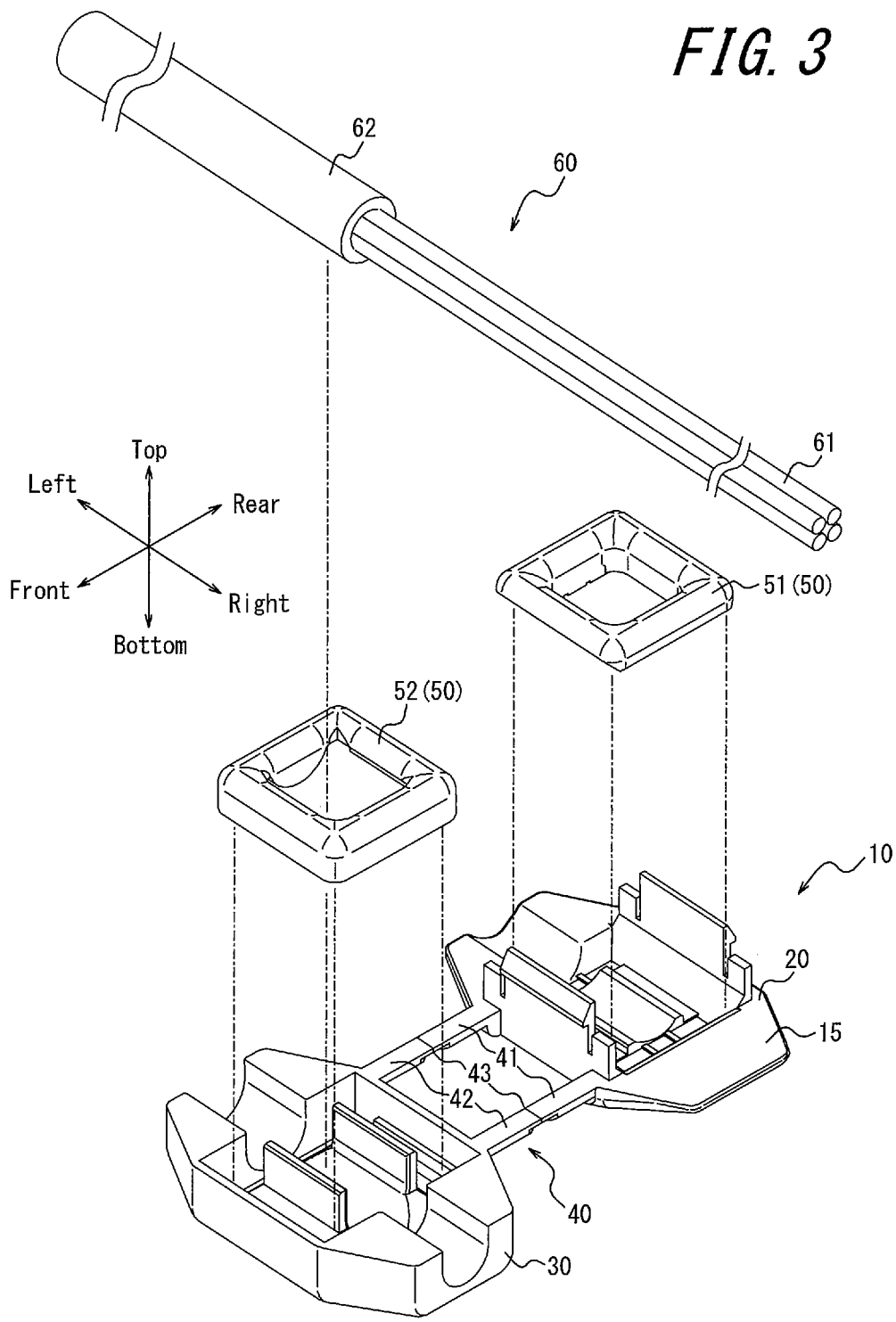
FIG. 3 is an exploded perspective view of the protection component and the object to be protected in FIG. 2.
Figure 4:
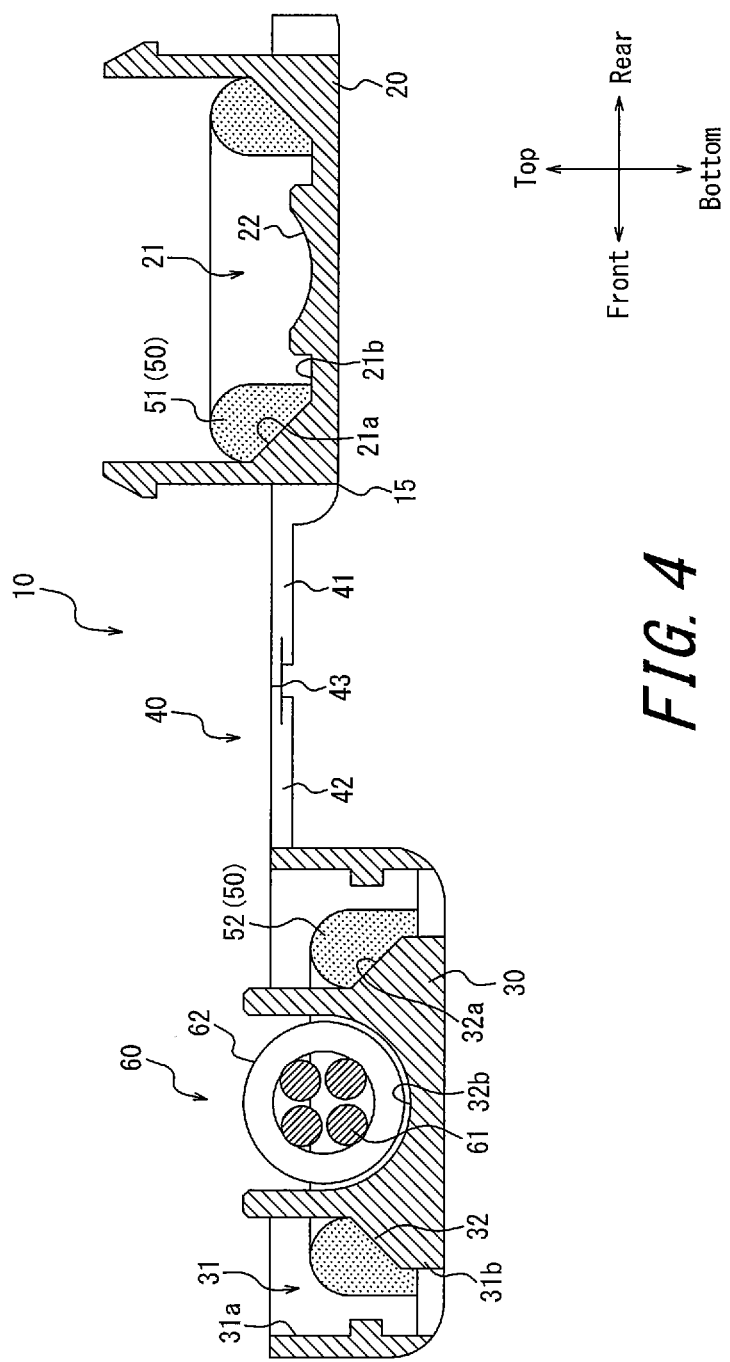
FIG. 4 is a cross-sectional view along arrows IV-IV in FIG. 2.

FIG. 1 is an external perspective view of a protection component 10, according to an embodiment, attached to an object to be protected 60. FIG. 2 is a perspective view of the protection component 10 in FIG. 1 that temporarily holds the object to be protected 60 in an extended state. FIG. 3 is an exploded perspective view of the protection component 10 and the object to be protected 60 in FIG. 2. FIG. 4 is a cross-sectional view along arrows IV-IV in FIG. 2.

With reference to FIG. 3, the protection component 10 according to an embodiment has a housing 15 and a filler 50 as a large component element. With reference to FIGS. 1 and 2, when the protection component 10 is in an extended state, the filler 50 loaded into the housing 15 supports the object to be protected 60. The protection component 10 surrounds a part to be protected of an object to be protected 60 by the housing 15 and the filler 50 with the object to be protected 60 held to protect the part from outside. The protection component 10 provides protection functions including a waterproof function, a dustproof function, an isolation function and a rustproof function to the part to be protected of the object to be protected 60. Hereinafter the object to be protected 60 to which the protection component 10 is attached is an electric wire bundle that includes a plurality of electric wires 61, as an example. The part to be protected of the object to be protected 60 is a part where a protective coating 62 of an electric wire bundle has been removed, for example. An electric wire bundle covered by a protective coating 62 of the object to be protected 60 extends outward from one end of the protection component 10, and a plurality of exposed electric wires 61 extend outward from the other end. The object to be protected 60 and the part to be protected of the object to be protected 60 are not limited thereto. The object to be protected 60 and the part to be protected of the object to be protected 60 may be any object to be protected and any part to be protected, respectively. The part to be protected of the object to be protected 60 may be an end of cut electric wire or an exposed metal pin and the like.

With reference to FIGS. 3 and 4, the housing 15 is a mold made of an insulating and heat-resistant synthetic resin material. The housing 15 includes a first housing 20 and a second housing 30 capable of being fitted together. The housing 15 has a connecting portion 40 as a coupling that connects the first housing 20 and the second housing 30. The housing 15 has the first housing 20, the second housing 30 and the connecting portion 40 in an integrally molded manner.

The connecting portion 40 has a pair of first connecting portions 41, arranged in the right-left direction, extending linearly from the first housing 20. The connecting portion 40 has a pair of second connecting portions 42, arranged in the right-left direction, extending linearly from the second housing 30. The connecting portion 40 has fold-facilitating portions 43 that couple the first connecting portions 41 and the second connecting portions 42. The pair of first connecting portions 41 arranged in the right-left direction and the pair of second connecting portions 47 arranged in the right-left direction are flushed with each other in an extended state.

The fold-facilitating portions 43 are thinner than the first connecting portions 41 and the second connecting portions 42 arranged in the right-left direction. Each of the pair of first connecting portions 41 and the pair of second connecting portions 42 arranged in the right-left direction can be folded at the fold-facilitating portions 43 that extend in the right-left direction and serve as a folding line for valley-folding. The connecting portion 40 can be folded in the direction that the first housing 20 and the second housing 30 come close to each other.

The first housing 20, the first connecting portion 41, the fold-facilitating portion 43, the second connecting portion 42 and the second housing 30 have rigidity sufficient to autonomously maintain the extended state in an extended state.

The filler 50 includes a first filler 51 and a second filler 52 loaded into the first housing 20 and the second housing 30, respectively. The filler 50 contains any material including UV curable resins, waterproof gels, adherences and the like that have coalescence properties or adherence properties. The first filler 51 and the second filler 52 may, in a state where the first housing 20 and the second housing 30 are fitted together, be coalesced and integrated to each other or may adhere to each other and form a bonding surface. Hereinafter the description will be made on the assumption that the filler 50 has coalescence properties, and the first filler 51 and the second filler 52 are coalesced and integrated to each other in the first housing 20 and the second housing 30 in a fitting state.

For example, the filler 50 is composed of UV curable resin that effectively exhibits protection function including waterproof, dustproof, insulating or rustproof function. More specifically, the filler 50 is composed of a material mainly comprising urethane acrylate, epoxy acrylate, acrylic resin acrylate, polyester acrylate, polybutadiene acrylate, silicon acrylate, amino resin acrylate, urethane vinyl ether, polyester vinyl ether, silicone elastomer, styrene elastomer, or polyethylene polystyrene elastomer or the like. For example, the filler 50 is composed of a material mainly comprising urethane acrylate that has coalescence properties, elasticity and heat resistance altogether.

With reference to FIG. 3, the object to be protected 60 is an electric wire bundle in which four electric wires 61 are covered by a tubular protective coating 62 having flexibility and insulating properties. The protective coating 62 of the object to be protected 60 is removed from a predetermined position thereof, and the four electric wires 61 extend from the predetermined position in an exposed state.

Figure 5:
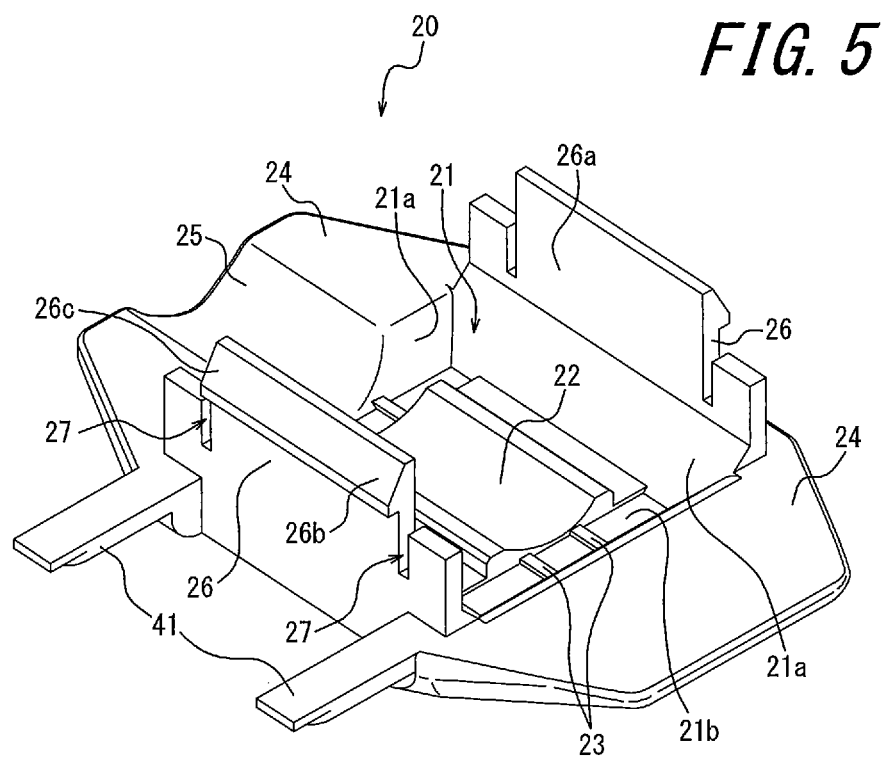
FIG. 5 is a perspective view in which only a first housing is enlarged.
Figure 5:
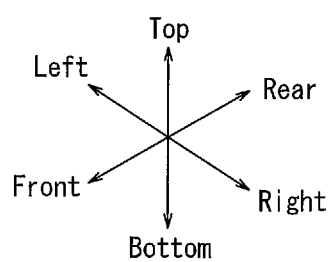

FIG. 5 is a perspective view in which only the first housing 20 is enlarged. Structure of the first housing 20 will be described in detail below with reference to FIG. 5.

The first housing 20 has, at the center portion thereof, a recess 21 formed in a substantially rectangular shape when viewed from top. The recess 21 has four side surfaces 21a including front, rear, left and right side surfaces and a bottom 21b. Each of the four side surfaces 21a forms an inclined surface that inclines inward from top to bottom. The front, rear, left and right widths of the recess 21 gradually narrow downward. The first housing 20 has a first receiving portion 22 extending in the right-left direction at the bottom 21b. The surface of the first receiving portion 22 has a substantially arc-like curved surface. The first housing 20 has a pair of pressing portions 23 each protruding on the right and left sides of the first receiving portion 22 at the bottom 21b of the recess 21. The pair of pressing portions 23 is composed of a pair of ribs that are formed in parallel in the front-rear direction and extend in the right-left direction. The first housing 20 has cover portions 24 that are formed on the right-left ends and are continuous to the recess 21 on the inside thereof. The upper surface of the cover portion 24 is formed in a substantially planar shape. The cover portions 24 protrude outward from the recess 21 along the right-left direction, and the front-rear width thereof gradually narrows outwardly. The first housing 20 has a second receiving portion 25 that is provided in a recessed manner on the upper surface of the cover portion 24 on the left end and is continuous to the recess 21 on the inside thereof. The surface of the second receiving portion 25 has a substantially arc-like curved shape.

The first housing 20 has a pair of first locking portions 26 protruding upward from the front-rear edges of the recess 21 and extending in the right-left direction. The first locking portions 26 have elasticity. The first locking portions 26 protrude stepwise from right-left ends on the front-rear sides of the first housing 20. Each first locking portion 26 has an inner surface 26a formed in a substantially planar shape along the top-bottom direction. The first locking portions 26 have first locking protrusions 26b protruding outward from the front-rear sides of the first housing 20. The first locking protrusions 26b extend in the right-left direction. The first locking protrusions 26b each has an inclined surface 26c inclining outward the first housing 20 in the downward direction. The first housing 20 has four notches 27 each formed between right-left ends on the front-rear sides and the first locking portion 26. Each notch 27 is formed as a cutout along a protruding direction of the first locking portion 26, that is, along the top-bottom direction.

Figure 6:
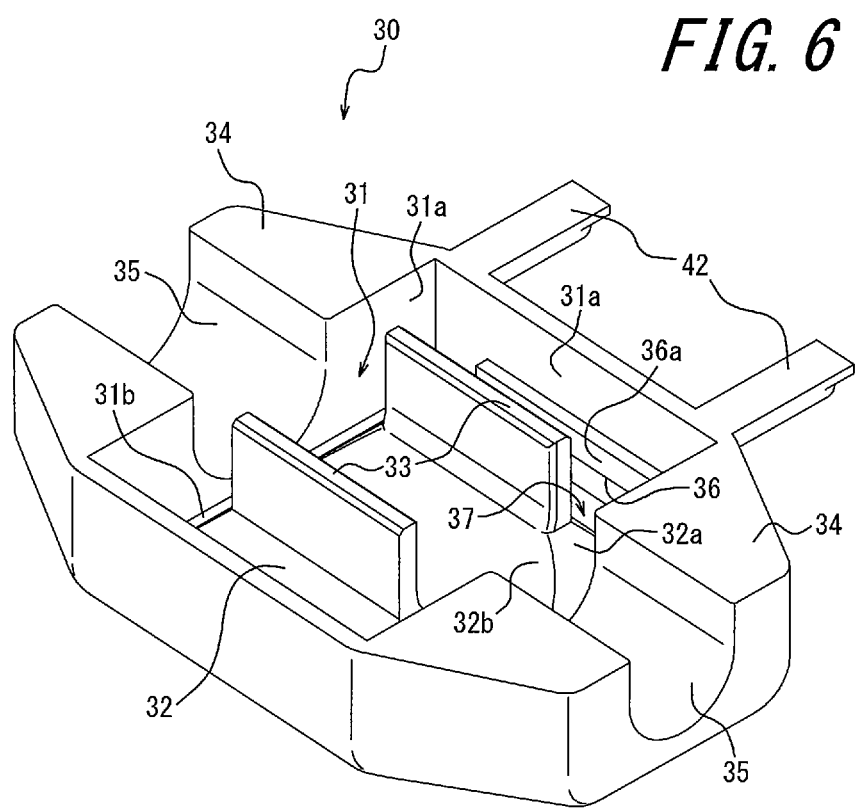
FIG. 6 is a perspective view in which only a second housing is enlarged.
Figure 6:
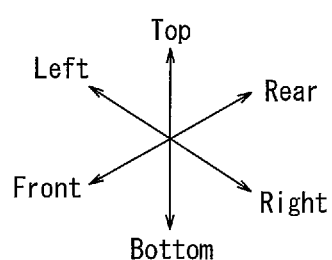

FIG. 6 is a perspective view in which only the second housing 30 is enlarged. The structure of the second housing 30 will be described in detail below with reference to FIG. 6.

The second housing 30 has, at the center portion thereof, a recess 31 formed in a substantially rectangular shape when viewed from the top. The recess 31 has four side surfaces 31a located on front, rear, left and right sides and a bottom 31b. The four side surfaces 31a are each formed in a substantially planar shape along the top-bottom direction. The second housing 30 has a raised portion 32 raised upward in a substantially truncated square pyramid shape from the bottom 31b. The raised portion 32 has four inclined surfaces 32a each located on the front, rear, right and left sides. Each inclined surface 32a inclines inward of the second housing 30 in the upward direction. The second housing 30 has a first holding portion 32b that is provided in a recessed manner from the overall upper surface of the raised portion 32 to the inclined surfaces 32a on the right and left sides. The first holding portion 32b is provided extending along the right-left direction. The surface of the first holding portion 32b has a substantially arc-like curved shape. The second housing 30 has a pair of wall portions 33 protruding upward from the front-rear edges on the upper surface of the raised portion 32. The pair of wall portions 33 are formed in substantially parallel to each other and extend in the right-left direction. The second housing 30 has supporting portions 34 that are formed on the right-left ends and are continuous to the recess 31 on the inside thereof. The upper surface of each supporting portion 34 is formed in a substantially planar shape. Each supporting portion 34 protrudes outward from the recess 31 along the right-left direction, and the front-rear width thereof gradually narrows toward outside. The second housing 30 has second holding portions 35 that are provided in a recessed manner in a substantially U-shape from the upper surface of the supporting portions 34 provided on the right-left ends and are continuous to the recess 31 on the inside thereof. The second holding portions 35 on the right and left sides and the first holding portion 32b are disposed at a substantially same position in the front-rear direction. The second holding portions 35 on the right-left ends are located on an axis passing through the first holding portion 32b.

The second housing 30 has a pair of second locking portions 36 formed on the side surfaces 31a on the front-rear sides. Each second locking portion 36 has a pair of second locking protrusions 36a provided in a protruding manner on the inside of the side surfaces 31a on the front-rear sides and extending in the right-left direction. Each second locking protrusion 36a has a substantially rectangular parallelepiped shape. The second housing 30 has a penetrating portion 37 passing through to both front and rear ends of the bottom 31b. The penetrating portion 37 extends along the right-left direction and has a width that is slightly wider than that of the second locking protrusion 36a in the right-left direction.

Figure 7:
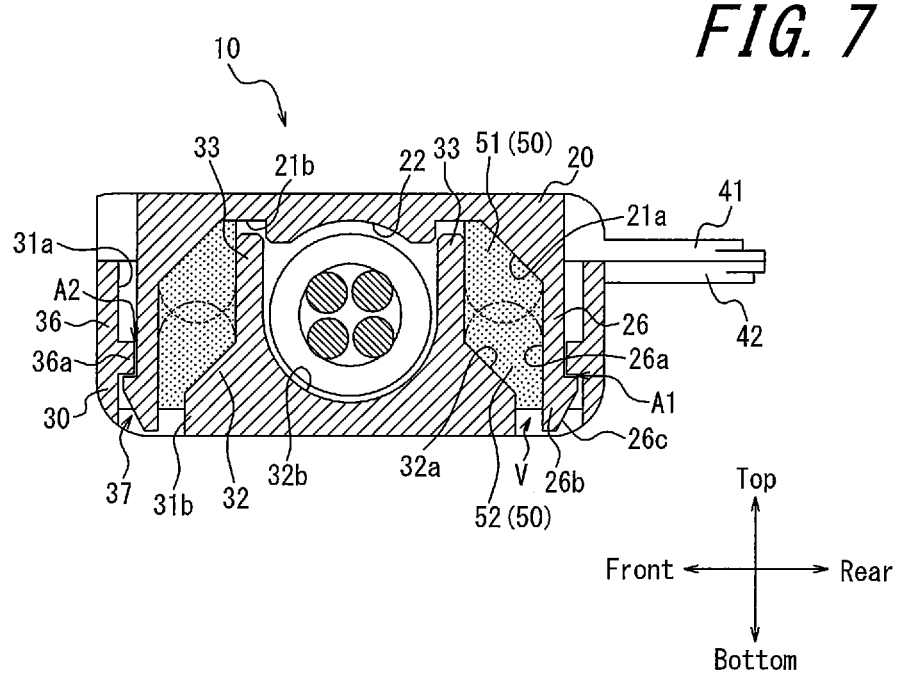
FIG. 7 is a cross-sectional view along arrows VII-VII in FIG. 1.
Figure 8:
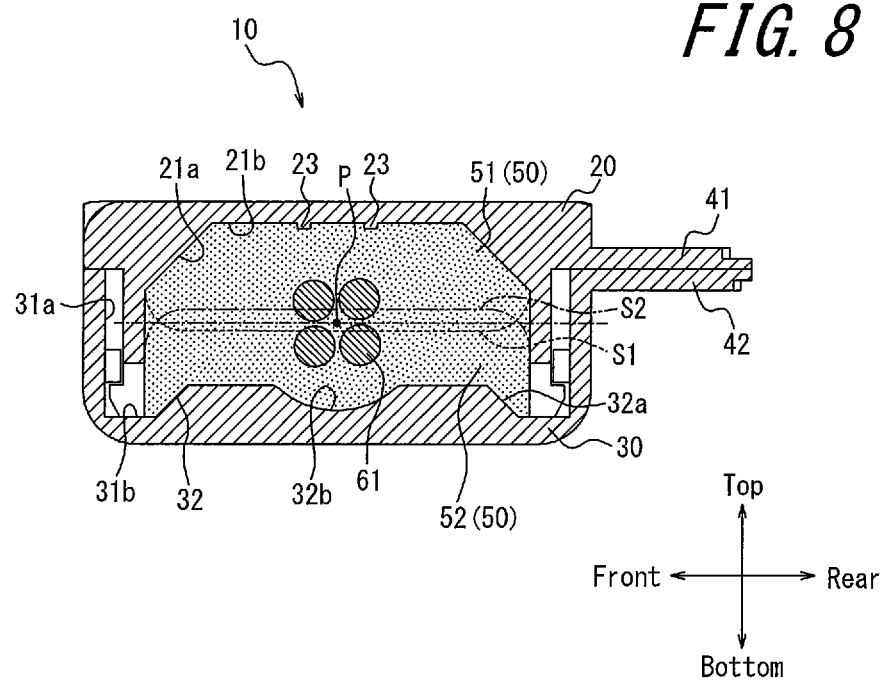
FIG. 8 is a cross-sectional view along arrows VIII-VIII in FIG. 1.

FIG. 7 is a cross-sectional view along arrows VII-VII in FIG. 1. FIG. 8 is a cross-sectional view along arrows VIII-VIII in FIG. 1. Function of each component when the housing 15 transits from the extended state illustrated in FIG. 2 to the locked state will be described in detail with reference to FIGS. 7 and 8.

The protection component 10 surrounds and protects the part to be protected of the object to be protected 60 with the following method. The filler 50 is loaded into the first housing 20 and the second housing 30 capable of being fitted together. The loaded filler 50 supports the object to be protected 60. The first housing 20 and the second housing 30 are fitted together.

More specifically, with reference to FIG. 2, an assembler, for example, allows the object to be protected 60 to be temporarily held by the first holding portion 32b and the second holding portion 35 by his/her hand, using the wall portion 33 as a reference for alignment. In this state, the assembler rotates the first housing 20 toward the second housing 30 about the right and left fold-facilitating portions 43 by using a hand or a common tool such as pliers, which allows the inclined surface 26c of the first locking protrusion 26b on the first housing 20 side to come in contact with the corresponding second locking protrusion 36a. When the first housing 20 is further rotated, while the inclined surface 26c of the first locking protrusion 26b slides the second locking protrusion 36a, the corresponding first locking portion 26 is elastically deformed to the inside of the first housing 20.

When the first housing 20 is further rotated toward the second housing 30, the first locking protrusion 26b rides over the corresponding second locking protrusion 36a and engages with each other. In this manner, the first locking portion 26 and the first filler 51 of the first housing 20 are housed in the second housing 30. With reference to FIG. 7, the first locking portion 26 and the second locking portion 36 are engaged with each other inside the first housing 20 and the second housing 30 in a fitting state. In this case, the inner surface 26a of the first locking portion 26 comes in contact with the filler 50. The tip of the first locking portion 26 comes close to the bottom 31b, in particular to the penetrating portion 37 of the second housing 30. An engagement surface A1 between the first locking protrusion 26b and the second locking protrusion 36a is located within the top-bottom width of the filler 50 in the top-bottom direction. The surface of the second locking protrusion 36a in the front-rear direction comes in contact with the outer surface of the first locking portion 26. A contact surface A2 formed thereby is substantially in parallel with the inner surface 26a of the first locking portion 26 that comes in contact with the filler 50. A portion of the penetrating portion 37 located on the inside of the first locking portion 26 in the front-rear direction forms a space V into which a surplus filler 50 enters.

When the first housing 20 and the second housing 30 are fitted together and transit into a locked state, the first receiving portion 22 of the first housing 20, the cover portion 24 and the second receiving portion 25 cover the object to be protected 60 from above. In this case, the cover portion 24 of the first housing 20 is supported by the supporting portion 34 of the second housing 30.

Inside the first housing 20 and the second housing 30 fitted together are filled with the filler 50. More specifically, when the first housing 20 and the second housing 30 transit into a locked state, almost all over the space surrounded by the side surface 21a of the recess 21, the first locking portion 26, the inclined surface 32a and the wall portion 33 is filled with the filler 50. The filler 50 surrounds the part to be protected of the object to be protected 60 housed in a space surrounded by the first receiving portion 22, the wall portion 33 and the first holding portion 32b.

With reference to FIGS. 4 and 7, the lower portion of the first filler 51 is loaded into the recess 21 along the side surface 21a and the bottom 21b of the recess 21. The upper portion of the first filler 51 protrudes upward from the recess 21. The height of the first filler 51 is a height enough to allow the first filler 51 and the second filler 52 to coalesce when the first housing 20 and the second housing 30 are fitted together. The first filler 51 surrounds the first receiving portion 22.

The second filler 52 is loaded to into the recess 31 along the side surface 31a and the bottom 31b of the recess 31 and the inclined surface 32a of the raised portion 32. The height of the second filler 52 is a height enough to allow the first filler 51 and the second filler 52 to coalesce when the first housing 20 and the second housing 30 are fitted together. The second filler 52 surrounds the first holding portion 32b.

In the locked state, the first filler 51 and the second filler 52 crush against each other and are brought into a compressed state once, and then closely adhere to each other. In this case, when the filler 50 is composed of a material having coalescence properties, the first filler 51 and the second filler 52 are integrated to each other through a chemical reaction such as hydrogen bonding. For example, even if the first housing 20 and the second housing 30 are separated along the top-bottom direction, once the first filler 51 and the second filler 52 are coalesced, they don't separate to each other. Since the first filler 51 and the second filler 52 coalesced to each other has no bonding surface, peeling off of a bonding surface caused by a mechanical action or thermal expansion may not occur. Even if the first housing 20 and the second housing 30 are separated to each other along the top-bottom direction, the first filler 51 and the second filler 52 coalesced to each other remain extended in an integrated manner and continue to seal around the part to be protected of the object to be protected 60. When the filler 50 has both coalescence properties and elasticity, it extends to some extent due to vibrations and the like of the protection component 10. Even in this case, the first filler 51 and the second filler 52 coalesced to each other remain integrated and extend and contract uniformly. Distribution of the stress acting on the first filler 51 and the second filler 52 coalesced to each other is substantially uniform entirely.

With reference to FIG. 8, when a compressed state due to close adherence of the first filler 51 with the second filler 52 is not assumed, the end surface S1 of the first filler 51 is located on the second filler 52 side of the center P in the top-bottom direction of the object to be protected 60 in the locked state. As illustrated with dashed lines in FIG. 8, the end surface S1 of the first filler 51 is located below the center P.

In the same manner, when a compressed state due to close adherence with the first filler 51 is not assumed, the end surface S2 of the second filler 52 is located on the first filler 51 side of the center P in the top-bottom direction of the object to be protected 60 in the locked state. As illustrated with dashed lines in FIG. 8, the end surface S2 of the second filler 52 is located above the center P.

In this manner, the end surface S1 and the end surface S2 are located on the other filler 50 side of the center P. Location of each tip surface is not limited thereto. If the condition that the first filler 51 and the second filler 52 are overlapped with each other by a predetermined thickness along the top-bottom direction is satisfied, only a tip surface of either one of the first filler 51 and the second filler 52 may be located on the other filler 50 side of the center P.

The pressing portions 23 press the first filler 51 inward along the top-bottom direction such that the first filler 51 closely adheres to the object to be protected 60. For example, the pressing portions 23 are disposed on the positions in the front-rear direction which are substantially the same as those of the front-rear ends of a bundle of four electric wires 61 exposed from the protective coating 62. At this time, the pressing portions 23 press the first filler 51 toward the front-rear ends of the bundle of the electric wires 61 along the front-rear direction. With such an action of the pressing portions 23, the filler 50 surrounds the surface of the object to be protected 60 as if it closely adheres thereto. For example, as illustrated in FIG. 8, in a state where the first housing 20 and the second housing 30 are fitted together, each of four electric wires 61 of the object to be protected 60 is disposed in the filler 50 when viewed from a cross-section along the top-bottom direction. More specifically, since the coalesced filler 50 has no bonding surface, portions corresponding to each of four electric wires 61 of the object to be protected 60 are completely embedded in the filler 50. In this manner, unlike the case where materials each having adherence properties such as silicone gel are bonded to each other, almost no gap is formed between the surface of the electric wire 61 and the filler 50.

The protection component 10 according to the above described embodiment improves workability of attachment and a long-term reliability of protection. For example, in order to attach the protection component 10 to the object to be protected 60, an assembler only requires to temporarily hold the object to be protected 60 by the protection component 10 and to fit the first housing 20 and the second housing 30 together. Therefore, even in the case where a work is performed in a place where it is difficult to perform the work, variations in the accuracy of the attachment work are reduced. As a result, variations in the long-term reliability can be reduced. An assembler does not need to use a special tool, and can attach easily by using his/her hand or a general tool. Since the filler 50 loaded into the housing 15 surrounds the part to be protected of the object to be protected 60 in the housing 15, the part to be protected is isolated from outside. In this manner, the protection component 10 can provide protection functions including waterproof, dustproof, insulating or rustproof function to the part to be protected of the object to be protected 60.

Since the second housing 30 has the first holding portion 32b and the second holding portion 35 that temporarily hold the object to be protected 60, an assembler can stably attach the object to be protected 60 to the protection component 10 which is in an extended state. Therefore, workability of attaching the protection component 10 to the object to be protected 60 is further improved.

Since the second housing 30 has the wall portion 33 formed inside the second holding portion 35 along the object to be protected 60, an assembler can easily align the object to be protected 60 with the protection component 10 in an extended state. Therefore, workability of attaching the protection component 10 to the object to be protected 60 is further improved. In addition, the wall portion 33 can prevent the filler 50 from entering from the front-rear direction into the part to be protected of the object to be protected 60 in a fitting state where the first housing 20 and the second housing 30 are fitted together. The wall portion 33 has a role of aligning the object to be protected 60 with the protection component 10 and a role as a protection wall against the filler 50.

When the filler 50 comes in contact with the inner surface 26a of the first locking portion 26, the first locking portion 26 with elasticity tends to elastically deform outward due to elasticity of the filler 50 from inside to outside caused by expansion or swelling. Since the protection component 10 has a locking mechanism therein, outward elastic deformation allows the protection component 10 to further firmly engage the first locking portion 26 and the second locking portion 36 with each other. More specifically, since the engagement surface A1 between the first locking protrusion 26b and the second locking protrusion 36a is located within the top-bottom width of the filler 50 in the top-bottom direction, an expansion force and the like of the filler 50 is efficiently converted into an engaging force. Since the contact surface A2 is substantially in parallel with the inner surface 26a of the first locking portion 26 that comes in contact with the filler 50, the expansion force and the like of the filler 50 is transmitted substantially vertical to the surface of the first locking portion 26 and the second locking protrusion 36a in the front-rear direction. Therefore, the expansion force and the like of the filler 50 is converted into an engaging force further efficiently. As a result, adherence between the first housing 20 and the second housing 30 is further improved. In this manner, even in a state where an elastic force acts from inside to outside, action of opening between the first housing 20 and the second housing 30 is suppressed. Therefore the protection component 10 can maintain the above described protection function. The above described effect is obvious under normal temperatures, and more obvious when the filler 50 expands more under high temperatures.

When the filler 50 has a high viscosity, opening between the first housing 20 and the second housing 30 is further suppressed. For example, when the filler 50 is disposed inside each of the first housing 20 and the second housing 30, the fillers 50 adhere to each other in a locking state. The adherence force generated in this case will act as a resistance against opening between the first housing 20 and the second housing 30 fitted together.

In the protection component 10, a locking mechanism is formed inside the first housing 20 and the second housing 30 fitted together. Thus, an outer wall can be formed into a substantially plane shape with less unevenness and through holes. In this manner, the protection component 10 can contribute to the above described improvement in the protection function. For example, the protection component 10 can prevent foreign matters such as water or dust from entering.

When the first locking portion 26 comes close to the bottom 31b of the second housing 30 with the tip thereof being in the locked state, the protection component 10 can prevent the filler 50 from reaching outside of the first locking portion 26 and burying the first locking portion 26 therein, in a fitting state.

More specifically, if the top-bottom width of the first locking portion 26 is short, at the stage where the first locking protrusion 26b and second locking protrusion 36a start engaging with each other, the tip of the first locking portion 26 does not come in contact with the second filler 52 loaded into the second housing 30. When the fitting process between the first housing 20 and the second housing 30 is proceeded under this state, the first locking portion 26 starts elastically deforming inward, and the tip of the first locking portion 26 elastically deformed inward is likely to stick into the end surface S2 of the filler 50 loaded into the second housing 30. Thus the filler 50 is split in the front-rear direction, and it is assumed that a part of the filler 50 reaches the outside of the first locking portion 26. In this case, the filler 50 reaches the outside of the first locking portion 26 before fitting is finished. As a result, when fitting is finished, the first locking portion 26 is buried in the filler 50.

On the other hand, in the protection component 10 according to an embodiment, at the stage where the first locking protrusion 26b and the second locking protrusion 36a start engaging with each other, the tip of the first locking portion 26 comes in contact with the outside surface of the filler 50 loaded into the second housing 30. Thus, even if the fitting is proceeded and the first locking portion 26 is elastically deformed inward, the tip of the first locking portion 26 does not stick into the end surface S2 of the filler 50, and the filler 50 is not split into the right and left. Rather, the inner surface 26a of the first locking portion 26 presses the outside surface of the filler 50 inward, and the first locking portion 26 itself acts to prevent the filler 50 from reaching the outside. The first locking portion 26 regulates movement of the filler 50. In this manner, the protection component 10 can reliably obtain a desired protection function.

A space V into which the filler 50 enters when the first housing 20 and the second housing 30 are fitted together is provided, which allows a surplus filler 50 to escape into the space V in a fitting state. In this manner, the filler 50 is further prevented from reaching the outside.

In the protection component 10, coalesced and integrated filler 50 surrounds the part to be protected of the object to be protected 60, and thus the possibility that foreign matter enters into the part to be protected is reduced. Since the first filler 51 and the second filler 52 are integrated by coalescence, compared with the conventional case where the adherence materials are joined to each other, a bonding force is significantly increased. Similarly, as in the case of the conventional materials, it is impossible that foreign matter enters from a small gap formed in a part of the bonding surface due to a weakened adhesive force. The protection component 10 can effectively protect the part to be protected of the object to be protected 60 against the hydraulic pressure applied to the entire filler 50. Conventionally, a relatively large pressure was needed to be applied to maintain bonding between adhesive materials. However, in the protection component 10 according to an embodiment, the bonding surface disappears and integrates, which requires no application of a large pressure. A sufficient protection function can be obtained without unnecessarily increasing a force for holding the fitting between the first housing 20 and the second housing 30.

In the protection component 10, a material containing urethane acrylate as a main component is used as the filler 50, thus a suitable protection member having coalescence properties, elasticity and heat resistance altogether can be obtained.

Since the first housing 20 and the second housing 30 are connected to each other by the connecting portion 40, an assembler can attach the protection component 10 to the object to be protected 60 more easily.

The pressing portions 23 allow foreign matters to be prevented sufficiently from entering inside even in a state where the protection component 10 is attached to the object to be protected 60. Thus the above described protection function can be obtained. When the filler 50 is deformed according to the shape of the object to be protected 60 by pressing with the pressing portions 23, the filler 50 closely adheres to the electric wire 61 and the protective coating 62. The pressing portions 23 can control the pressure on the surface of the filler 50 against the electric wire 61 and the protective coating 62 by pressing. In this manner, coalescence between the first filler 51 and the second filler 52 is improved near the electric wire 61 and the protective coating 62.

Formation of the notch 27 on each of the right and left sides of the first locking portion 26 allows the first locking portion 26 to be easily deformed in an elastic manner. Therefore, fitting between the first housing 20 and the second housing 30 is improved.

When the first locking protrusion 26b extending in one direction engages with the second locking protrusion 36a extending in the same direction, the engagement surface A1 constitutes a plane extending in the same direction, which expands the area of the engagement surface A1 and a firmer engagement can be obtained. When the engagement surface A1 is substantially horizontal as illustrated in FIG. 7, an engaging force is easily transmitted between the first locking protrusion 26b and the second locking protrusion 36a.

It will be apparent to those who are skilled in the art that the present disclosure may be realized in forms other than the embodiment described above, without departing from the spirit and the fundamental characteristics of the present disclosure. Accordingly, the above described description is merely illustrative and not limiting in any manner. The scope of the present disclosure is defined by the appended claims, not by the above described description. Among all modifications, those within a range of the equivalent to the present disclosure shall be considered as being included in the present disclosure.

For example, the above described shape, arrangement and number of each component are not limited to those described in the above description and illustrated in drawings. The shape, the arrangement and the number of each component may be constituted in any manner as long as the function thereof is realized. The above described assembly method of the protection component 10 is not limited to those described in the description. The protection component 10 may be assembled in any manner as long as the function thereof can be exhibited. For example, the protection component 10 may not have the connecting portion 40 as long as fitting properties can be maintained. In this case, the first housing 20 separated from the second housing 30 may be fitted with the second housing 30 from above.

Figure 9:
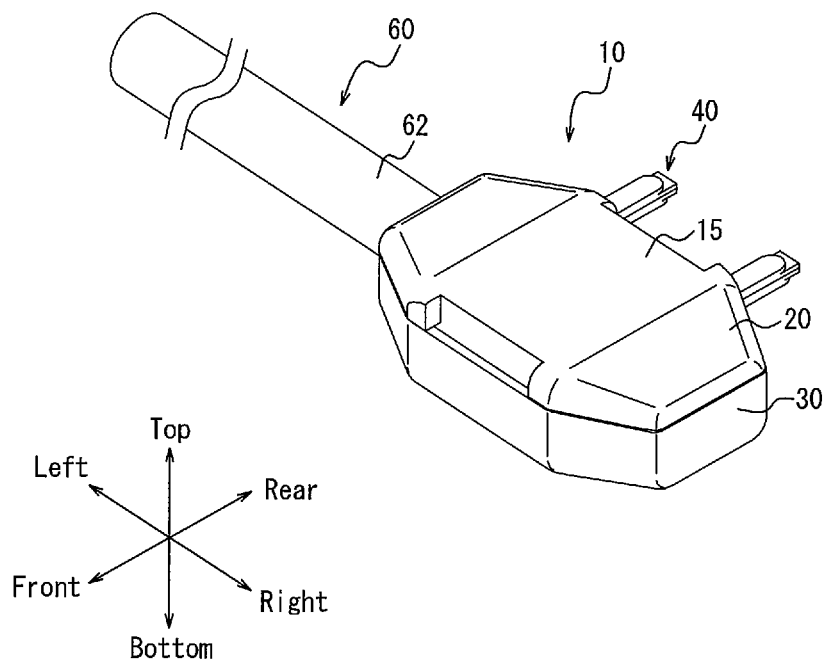
FIG. 9 is an external perspective view of a protection component according to a first variation attached to the object to be protected.

FIG. 9 is an external perspective view of the protection component 10 according to a first variation attached to the object to be protected 60. In the above description, the second holding portion 35 is described to be provided in a recessed manner at both right and left ends of the second housing 30, but is not limited thereto. The second holding portion 35 may be provided in a recessed manner only at one of the right and left ends of the second housing 30. For example, the second holding portion 35 may be provided in a recessed manner only at the left end of the second housing 30. In this case, the right end of the protection component 10 is blocked by the outer surface of each housing. Inside the protection component 10 is filled with the filler 50 that is loaded into the first housing 20 and the second housing 30. As described above, the housing 15 and the filler 50 surrounds the part to be protected of the object to be protected 60 while the object to be protected 60 is held. The above described protection component 10 can protect an end of a cut electric wire and an end of a metal pin, for example.

In the protection component 10 illustrated in FIG. 9, the filler 50 may be loaded into either one of the first housing 20 and the second housing 30. As long as an appropriate protection function can be obtained, neither the first housing 20 nor the second housing 30 need to be loaded with the filler 50.

Figure 10:
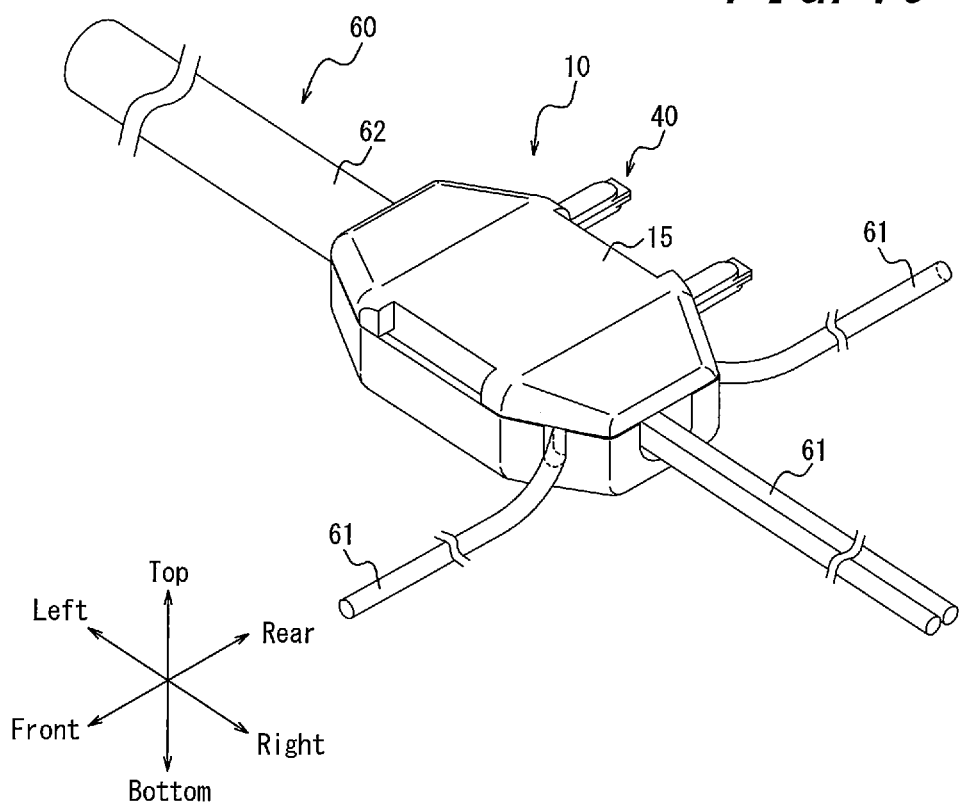
FIG. 10 is an external perspective view of a protection component according to a second variation attached to the object to be protected.

FIG. 10 is an external perspective view of the protection component 10, according to a second variation, attached to the object to be protected 60. An extending direction of a plurality of electric wires 61 is not limited to one direction. A plurality of electric wires 61 may extend in two or more directions. With reference to FIG. 10, for example, one of four electric wires 61 extends forward. The other one of four electric wires 61 extends backward. The remaining two electric wires 61 of four electric wires 61 extend rightward as described above.

Figure 11:
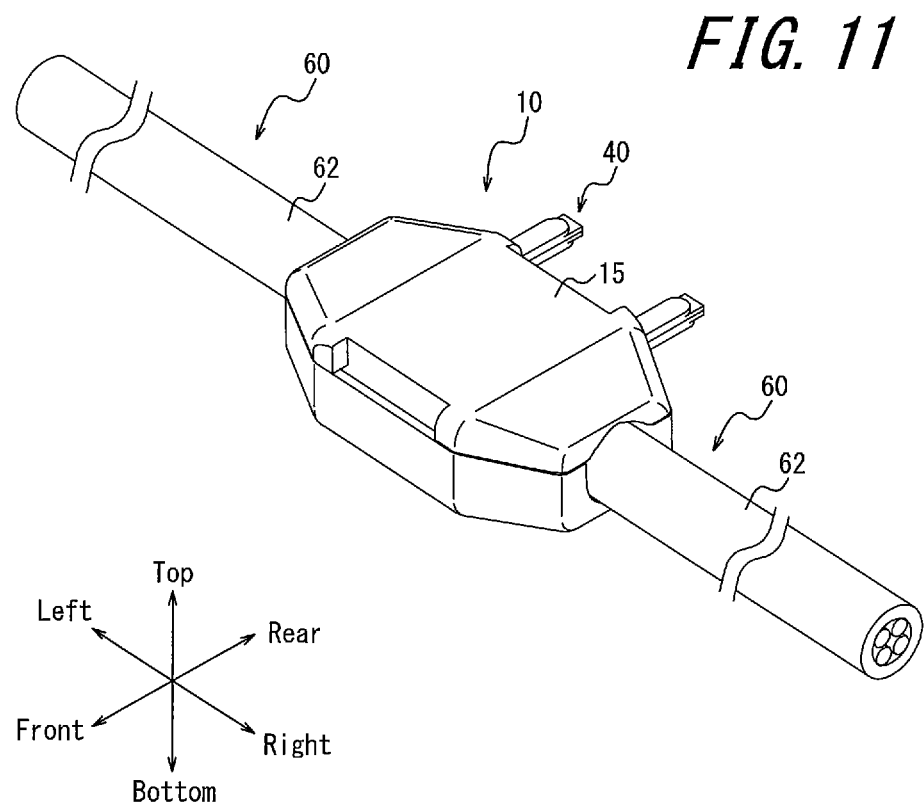
FIG. 11 is an external perspective view of a protection component according to a third variation attached to the object to be protected.

FIG. 11 is an external perspective view of the protection component 10, according to a third variation, attached to the object to be protected 60. The number of the object to be protected 60 to be protected by one protection component 10 is not limited to one. One protection component 10 may protect a plurality of objects to be protected 60. With reference to FIG. 11, for example, the protection component 10 protects two objects to be protected 60. In this case, cut ends of the two objects to be protected 60 are housed opposed to each other in the protection component 10. Arrangement of two objects to be protected 60 is not limited thereto, and the objects to be protected 60 may be arranged in any manner. For example, one object to be protected 60 may extend left from the left side surface of the protection component 10 and the other object to be protected 60 may extend forward from the front surface of the protection component 10.

Figure 12:
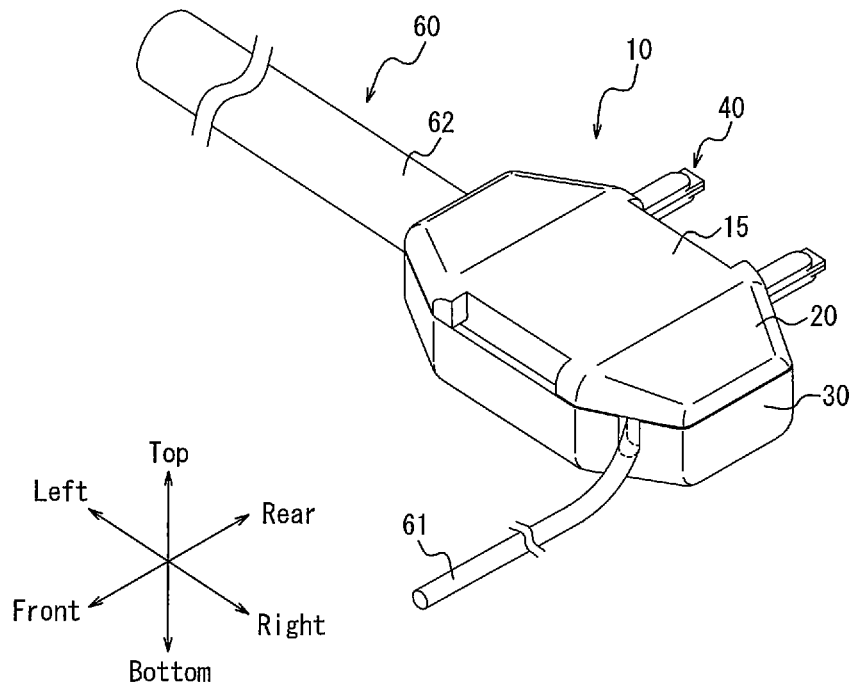
FIG. 12 is an external perspective view of a protection component according to a fourth variation attached to the object to be protected.

FIG. 12 is an external perspective view of the protection component 10, according to a fourth variation, attached to the object to be protected 60. The electric wire 61 of the object to be protected 60 may extend in any direction and any number of electric wires 61 may be used. With reference to FIG. 12, when the object to be protected 60 has four electric wires 61, for example, three electric wires 61 terminate in the protection component 10 and remaining only one electric wire 61 extends forward from the front surface of the protection component 10. In this manner, the protection component 10 may simultaneously protect the end of the electric wire 61 and the bent portion of the electric wire 61 therein.

Figure 13:
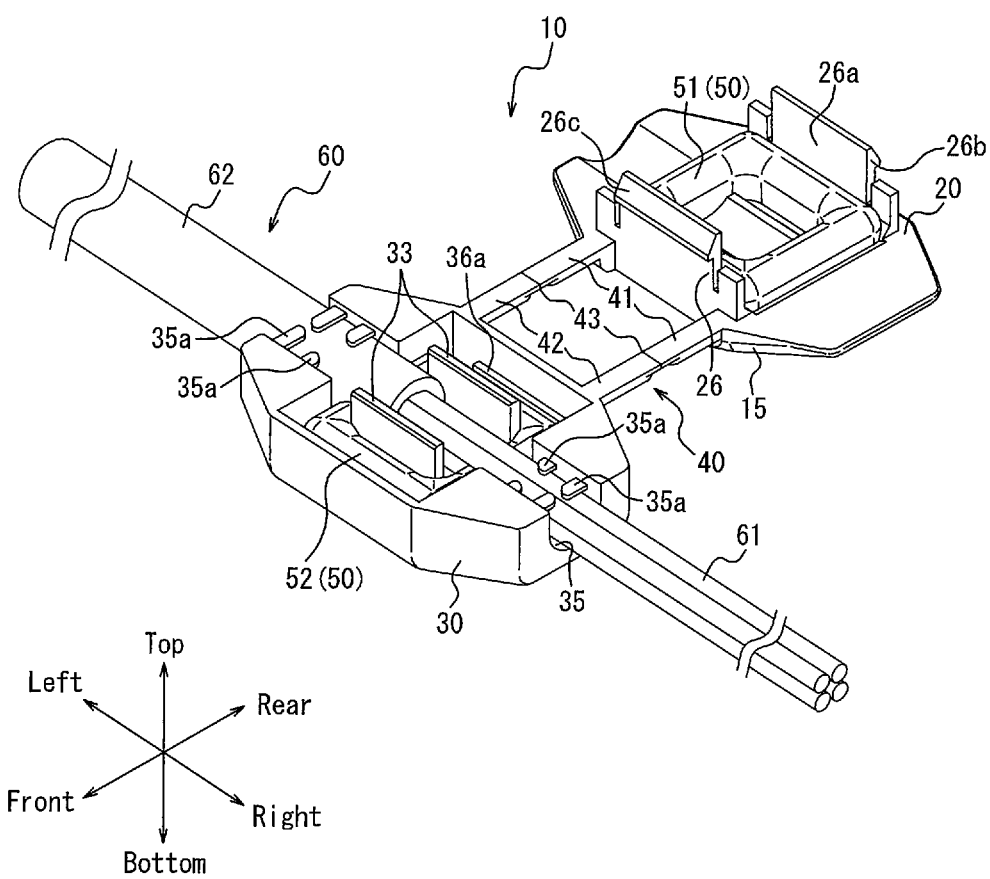
FIG. 13 is a perspective view of a protection component according to a fifth variation that temporarily holds the object to be protected in an extended state.

FIG. 13 is a perspective view of the protection component 10, according to a fifth variation, that temporarily holds the object to be protected 60 in an extended state. For example, the second holding portion 35 formed in the second housing 30 may have at least a pair of protrusions 35a protruding inward from both front and rear surfaces, respectively. For example, the second holding portion 35 may have two pairs of protrusions 35a. One of the two pairs of protrusions 35a is formed such that a distance between the protrusions 35a is larger than that of the other pair. For example, the object to be protected 60 having an electric wire bundle with a large diameter is clamped between the one of the two pairs of protrusions 35a and the second holding portion 35. For example, the object to be protected 60 having an electric wire bundle with a small diameter is clamped between the other one of the pairs of the protrusions 35a and the second holding portion 35. In this manner, when a plurality of pairs of protrusions 35a with different distance therebetween are formed, the protection component 10 can be attached to the object to be protected 60 having different diameters. Therefore, versatility of the protection component 10 is improved.

The object to be protected 60 can move in the extending direction while receiving a resistance from the protrusions 35a. Therefore, position of the object to be protected 60 in the extending direction can be adjusted with respect to the protection component 10 in an expanded state. When the object to be protected 60 is about to separate from the second holding portion 35, it receives a resistance acting to prevent separation from the protrusions 35a. Therefore, even if the protection component 10 is turned upside down, the object to be protected 60 does not easily fall out of the second holding portion 35. On the other hand, the object to be protected 60 can be separated from the second holding portion 35 by applying an urging force of a certain strength or greater, which facilitates replacement of the protection component 10 and change of the object to be protected 60 to be attached to or detached from the protection component 10.

With reference to FIG. 7, the engagement surface A1 between the first locking protrusion 26b and the second locking protrusion 36a is a substantially horizontal plane extending in the right-left direction, but is not limited thereto. For example, the engagement surface A1 may incline upward from the inside to the outside of the first housing 20 and the second housing 30 fitted together. Such cross-sectional shape allows the engagement force to be improved and the possibility of unlocking to be further reduced.

In the above description, the first locking portion 26 is formed in the first housing 20 and the second locking portion 36 is formed in the second housing 30. However, this is not restrictive, and the first locking portion 26 having elasticity may be formed in the second housing 30 that temporarily holds the object to be protected 60, and the second locking portion 36 may be formed in the first housing 20. The positions where the first locking portion 26 and the second locking portion 36 are formed in the first housing 20 and the second housing 30, respectively, are not limited to the above described positions. The first locking portion 26 and the second locking portion 36 may be formed in any position as long as lock can be maintained when the first housing 20 and the second housing 30 are fitted together.

In the above description, although the first locking portion 26 and the second locking portion 36 have the first locking protrusion 26b and the second locking protrusion 36a, respectively, and the first locking protrusion 26b and the second locking protrusion 36a are engaged with each other, the locking means is not limited thereto. The first locking portion 26 and the second locking portion 36 may have any locking means.

In the above description, although the first filler 51 and the second filler 52 are loaded into the first housing 20 and the second housing 30, respectively, this is not restrictive. The filler 50 may be loaded into either one of the first housing 20 and the second housing 30 as long as an appropriate protection function can be obtained.

REFERENCE SIGNS LIST

10 Protection component
15 Housing
20 First housing
21 Recess
21a Side surface
21b Bottom
22 First receiving portion
23 Pressing portion
24 Cover portion
25 Second receiving portion
26 First locking portion
26a Inner surface
26b First locking protrusion
26c Inclined surface
27 Notch
30 Second housing
31 Recess
31a Side surface
31b Bottom
32 Raised portion
32a Inclined surface
32b First holding portion
33 Wall portion
34 Supporting portion
35 Second holding portion (holding portion)
35a Protrusion
36 Second locking portion
36a Second locking protrusion
37 Penetrating portion
40 Connecting portion
41 First connecting portion
i42 Second connecting portion
43 Fold-facilitating portion
50 Filler
51 First filler
52 Second filler
60 Object to be protected
61 Electric wire
62 Protective coating
A1 Engagement surface
A2 Contact surface
P Center
S1 Tip surface
S2 Tip surface
V Space

The invention claimed is:

1. A protection component configured to protect a part to be protected of an object to be protected, comprising:
   a first housing and a second housing capable of being fitted together, wherein the second housing includes a pair of wall portions extending upwardly from a surface of the second housing; and
   a filler loaded into at least one of the housings, wherein said filler surrounds the pair of wall portions but does not contact a portion of the part to be protected located between the pair of wall portions,
   wherein said first housing has a first locking portion and said second housing has a second locking portion,
   wherein said first locking portion and said second locking portion engage with each other in said second housing in a fitting state where said first housing and said second housing are fitted together, and
   wherein said filler comes in contact with an inner surface of said first locking portion and said wall portion on an opposite side of said portion.

2. The protection component according to claim 1, wherein at least said second housing has a holding portion formed at an end and holding said object to be protected.

3. The protection component according to claim 2, wherein said holding portion is formed at each of a pair of ends opposed to each other of at least said second housing.

4. The protection component according to claim 2, wherein at least said second housing has said pair of wall portions formed inside of said holding portion.

5. The protection component according to claim 1, wherein:
   said first housing has said first locking portion formed on a side surface and having elasticity;
   said second housing has said second locking portion formed on a side surface.

6. The protection component according to claim 5, wherein a tip of said first locking portion comes close to a bottom of said second housing in a state where said first housing and said second housing are fitted together.

7. The protection component according to claim 1, wherein, at least one of the housings has a space into which said filler enters in a state where said first housing and said second housing are fitted together.

8. The protection component according to claim 1, wherein:

said filler has a first filler and a second filler loaded into said first housing and said second housing, respectively; and said first filler and said second filler coalesce and integrate to each other in said first housing and said second housing in a fitting state.

9. The protection component according to claim 1, wherein said first housing and said second housing are connected to each other by a connecting portion.

10. A protection method of protecting a part to be protected of an object to be protected, comprising the steps of:

providing a first housing having a first locking portion and a second housing having a second locking portion, the first housing configured to be fitted together with the second housing;

placing the part to be protected between a pair of wall portions extending upwardly from a bottom inner surface of the second housing;

loading a filler into at least one of the first housing and the second housing;

supporting said object to be protected by said filler, wherein said filler surrounds the pair of wall portions but does not contact a portion of the part to be protected located between the pair of wall portions; and fitting said first housing and said second housing together, wherein said first locking portion and said second locking portion engage with each other in said second housing in a fitting state where said first housing and said second housing are fitted together, and wherein said filler comes in contact with an inner surface of said first locking portion and said wall portion on an opposite side of said portion.

\* \* \* \* \*